Dec. 25, 1945.  E. V. BLOOMQUIST  2,391,383
SEPARABLE PACKING UNIT
Filed Nov. 11, 1944
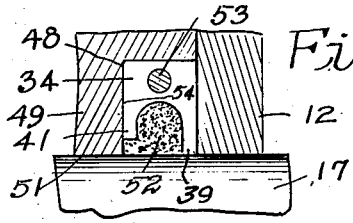
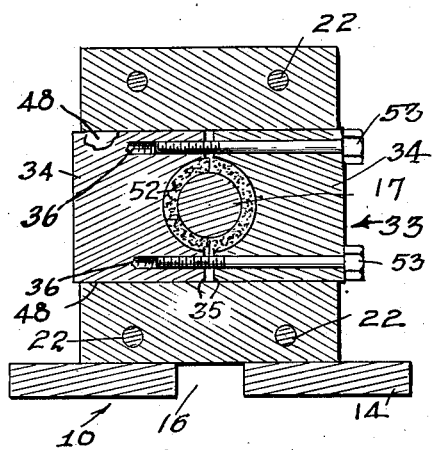
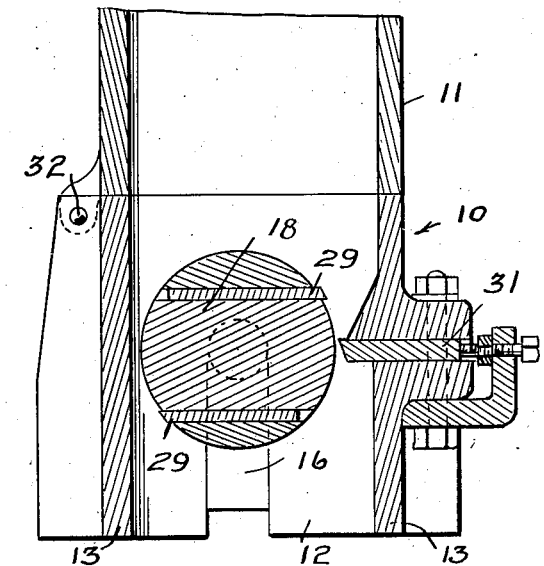
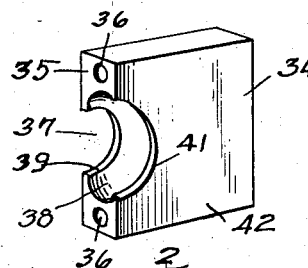
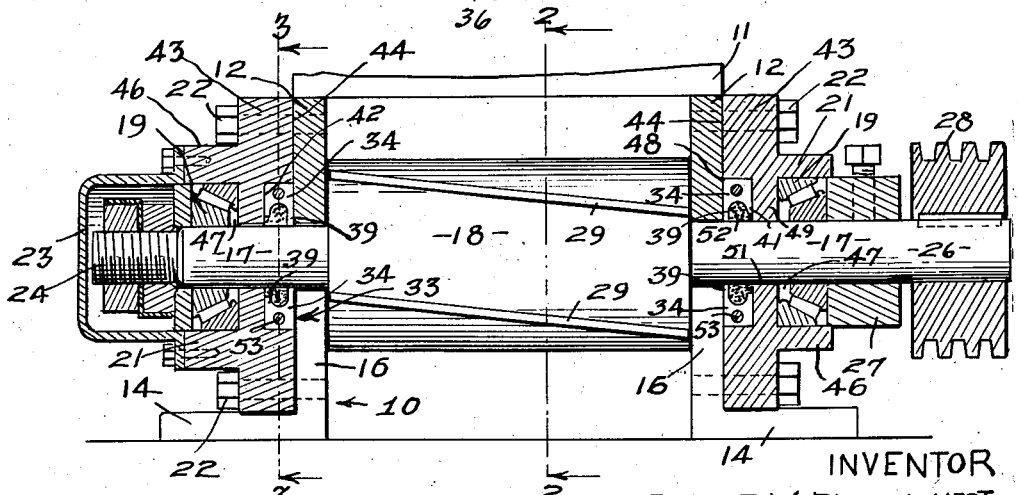
INVENTOR
EVERT V. BLOOMQUIST Patented Dec. 25, 1945

2,391,383

UNITED STATES PATENT OFFICE 2,391,383

SEPARABLE PACKING UNIT

Evert Victor Bloomquist, Wausau, Wis.

Application November 11, 1944, Serial No. 563,034

1 Claim. (Cl. 286—5)

This invention relates generally to packing units for rotatable shafts and the like and in particular to a separable packing unit adapted to provide a fluid seal about a shaft and with one side of a stationary member extended about the shaft.

An object of this invention is to provide an improved packing unit.

A further object of this invention is to provide a packing unit which effectively seals a shaft bearing against the passage thereto of fluid, greases and the like, from adjacent portions of the shaft.

Yet another object of this invention is to provide a packing unit capable of being quickly and directly removed from a shaft, for replacing worn packings, without requiring the removal of any machine parts with which the shaft is operatively associated.

A feature of this invention is found in the provision of a separable packing unit comprised of mating half sections having packing receiving grooves open to the inner periphery and to one side of the assembled unit whereby on clamping of the two sections together the packing material is forced outwardly from the packing receiving grooves in two directions substantially normal to each other.

Further objects, features and advantages of this invention will become apparent from the following description when taken in connection with the accompanying drawing in which:

Fig. 1 is a sectional view of a meat and bone-grinding machine showing the packing unit of this invention in assembly relation therewith;

Figs. 2 and 3 are sectional views taken on the lines 2—2 and 3—3, respectively, in Fig. 1;

Fig. 4 is a perspective view of a half section of the packing unit; and

Fig. 5 is an enlarged fragmentary sectional view of the packing unit illustrated similarly to the showing of the packing unit at the left in Fig. 1.

With reference to the drawing the packing unit of this invention is illustrated, by way of example, in assembly relation with a meat and bone-grinding machine comprising a housing having a base structure 10 and a hopper member 11 (Figs. 1 and 2). The base 10 is of a substantially rectangular shape, open at the top and bottom, and including end walls 12 and side walls 13. The bottoms of the end walls 12 are formed with pedestals 14, for supporting the grinder on a suitable stand or table (not shown), and with centrally located slot portions 16 for receiving a shaft 17 formed as part of a cutterhead member indicated generally as 18. The shaft 17 is rotatably supported in bearings 19 arranged at opposite ends of the base structure 10, with each bearing 19 being carried in a stationary bearing supporting member 21 secured by screws 22 or the like to a corresponding base end wall 12. A cap member 23 encloses bearing 19 at the shaft end 24 while the bearing 19 at the shaft end 26 is closed by a collar member 27 positioned between the bearing and a driving pulley 28 for the shaft.

The cutterhead 18 is of a cylindrical shape and carries a pair of oppositely arranged cutting knives 29 operatively associated with a stationary blade or knife 31 adjustably supported in one of the side walls 13 of the base structure 10. The hopper 11 is pivoted at 32 to the top of the base 10 and is held in assembly relation with the base by suitable clamping means (not shown). For a detail description of the meat and bone-grinding machine reference may be had to patent 2,224,948.

In the use of the grinding machine portions of animal carcasses and the like are thrown into the top of the hopper 11 and ground by the cooperative action of the rotating blades 29 and the stationary blade 31, with the ground material being discharged from the machine through the open bottom of the base structure 10. It is thus seen that the head member 18 is exposed to the ground material which includes fluid, bone particles, grease and the like. This material tends to force its way between the ends of the cutterhead 18 and the inner surfaces of the side walls 12 of the base structure 10, and then about the shaft 17 toward the bearings 19. The passage of the material into the bearings 19 is prevented by the provision of the packing unit of this invention which is indicated generally as 33. A packing unit 33 is associated with each bearing 19, and since the packing units are of a like construction only one thereof will be referred to in the following detail description.

A packing unit 33 is comprised of a pair of like mating half portions 34 (Figs. 3 and 4) each of which is of a substantially flat rectangular shape. Extended longitudinally through the section 34 in a laterally spaced relation are a pair of bolt-receiving openings 36. One end 35 of the section 34, intermediate the openings 36, is formed with a semi-circular recess 37 having a semi-circular groove 38 in the wall thereof. As best appears in Figs. 4 and 5 the marginal edge 39 of one side wall portion of the groove 38 is radially offset relative to the marginal edge 41 of the opposite side wall portion of the groove 38.

When the sections 34 are assembled in mating relation with their ends 35 adjacent each other, as shown in Fig. 3, the semi-circular recesses 37 define a central opening or bore in the packing unit 33, having a continuous annular groove in the side wall thereof formed by the mating semi-circular grooves 38. The marginal edges 39 of the grooves 38 constitute a bore portion of a reduced diameter which is substantially equal to the diameter of the shaft 17. The marginal edges 41 of the grooves 38 define an enlarged bore portion the periphery of which is spaced an appreciable distance from the outer periphery of the shaft 17 for a purpose to be later noted. Thus when the sections 34 of a packing unit 33 are assembled about the shaft 17 the grooves 38 are open to the periphery of the shaft 17 and to the side 42 of the packing unit (Fig. 1).

Each bearing supporting member 21, previously mentioned, is integrally formed with a flat body member 43 having one side 44 positioned against an end 12 of the base 10, and an annular flange 46 laterally projected from its other side. The flange 46 defines a cavity 47 for receiving a bearing member 19. A transverse groove 48 in the side 44 of the body member 43 is adapted to receive a packing unit 33 and is spaced from the cavity 47 by a wall member 49. The shaft 17 is received through a cavity 47, a groove 48 and a central opening 51 in the wall member 49, which is extended about the shaft.

In the assembly of the shaft 17 and the bearings 19 with the base 10 the shaft, with the cutterhead 18 thereon, is positioned within the slots 16 and moved upwardly against the upper ends of the slots 16 (Figs. 1 and 2). The supporting members 21 are slipped over the shaft ends 24 and 26 and connected to the end walls 12 of the base 10 by the screws 22. The bearings 19 are then slipped over the shaft ends 24 and 26 and positioned within their corresponding cavities 47 and the collar 27 placed on the shaft end 26 and the bearing cover 23 over the shaft end 24. It is thus seen that the shaft 17 and bearings are assembled independently of the packing units 33.

In the assembly of a packing unit 33, a packing material indicated at 52 is first positioned within the groove 38 of each section 34. A first section 34, with the packing material 52 therein, is then inserted within one end of a corresponding slot 48 with the marginal edge 39 adjacent an end 12 of the base 10, whereby the marginal edge 41 is adjacent the partition or wall member 49 (Fig. 5). The second section 34 of the packing unit 33 is then inserted within the opposite end of the slot 48 and in a mating relation with the first section 34. The two sections 34 are then clamped about the shaft 17 by clamping bolts 53 threadably received in the section openings 36.

On clamping the sections 34 together the packing material is forced radially outwardly from the grooves 38 against the outer periphery of the shaft 17, and in a direction axially of the shaft 17 against the wall member 49, through the space provided between the marginal edges 41 of the grooves 38 and the outer peripheral surface of the shaft 17. As a result the packing material 52 is forced outwardly from the grooves 38 in two directions substantially normal to each other to provide a fluid seal engagement between the packing unit and the shaft 17, and between the packing unit and the wall member 49. By virtue of this double sealing action of the packing unit 33 fluid, grit, grease and like materials from within the base 10 are prevented from travelling along the shaft 17 into the bearing 19, and about the packing unit 33 and along the side 54 of the wall member 49 into the bearing 19.

As best appears from Figs. 1 and 3 the sections 34 of a packing unit 33 are held in mating relation about the shaft 17 by the bolts 53, and against rotation with the shaft 17 by virtue of its reception in the slot 48. The packing unit is held against axial movement in one direction relative to the shaft 17 by an end 12 of the base 10, and against axial movement in an opposite direction by the wall member 49. In other words a slot 48 and a corresponding end wall 12 define a packing unit receiving pocket.

When the packing material 52 becomes worn and is to be replaced it is only necessary to loosen the bolts 53 and remove the sections 34 from opposite ends of a slot 48. New packing material is then positioned within the grooves 38 and the packing unit assembled about the shaft 17 in the manner described above. A packing unit is thus capable of being removed from and assembled in the machine independently of the shaft 17 and bearings 19.

From a consideration of the above description it is seen that the invention provides a split or separable packing unit capable of forming a packing engagement or seal with a rotatable shaft, and with a stationary member extended about the shaft to one side of the packing unit so as to prevent the passage of foreign materials along the shaft from one side of the packing unit to the opposite side of the packing unit. Further the packing unit is directly removable from a machine without disturbing or dismantling adjacent parts of the machine whereby removal of the packing unit for replacing a worn packing material is accomplished easily and quickly and with a minimum of effort and time.

Although the invention has been described with respect to a preferred embodiment thereof it is to be understood that it is not to be so limited since changes and modifications can be made therein which are within the full intended scope of this invention as defined by the appended claim.

I claim:

In a supporting member for a shaft having formed therein a first opening for receiving said shaft and a second opening normal to said first opening and extended through said first opening, a packing unit receivable in said second opening and comprised of mating half sections adapted to encircle said shaft, said packing unit having a central bore with an annular groove in the side wall thereof adapted to receive a packing material, and with the portions of said bore at opposite sides of said groove being of a different diameter, and means for clamping said half portions about said shaft, with the clamping action forcing the packing material against said shaft, and outwardly from the packing unit, through the portion of said bore of smaller diameter, against the side wall of said second opening adjacent to said smaller diameter bore portion.

EVERT VICTOR BLOOMQUIST.